United States Patent [19]
Guichard

[11] 4,128,224
[45] Dec. 5, 1978

[54] SUPPORT DEVICE FOR DISPLAYING SPECTACLES

[75] Inventor: Claude Guichard, Saint-Claude, France

[73] Assignee: Etablissements Rene Guichard, Saint-Claude, France

[21] Appl. No.: 796,660

[22] Filed: May 13, 1977

[30] Foreign Application Priority Data

May 20, 1976 [FR] France .................. 76 15269

[51] Int. Cl.² .................................... A47F 5/00
[52] U.S. Cl. .................... 248/316 A; 248/DIG. 2; 248/305
[58] Field of Search .......... 248/316 R, 316 A, 316 C, 248/DIG. 2, 305; 24/263 SB

[56] References Cited
U.S. PATENT DOCUMENTS

| | | | |
|---|---|---|---|
| 402,791 | 5/1889 | Adams | 24/263 SB |
| 547,470 | 10/1895 | Zestermann | 248/DIG. 2 |
| 1,011,594 | 12/1911 | Dunham | 248/316 A |
| 2,411,361 | 11/1946 | Bongiovanni | 248/DIG. 2 |
| 2,467,251 | 4/1949 | Bowman | 248/DIG. 2 |
| 2,958,495 | 11/1960 | Foster | 248/DIG. 2 |
| 3,963,208 | 6/1976 | Sova | 248/316 A |

*Primary Examiner*—Robert A. Hafer
*Attorney, Agent, or Firm*—Fitzpatrick, Cella, Harper & Scinto

[57] ABSTRACT

A support device for displaying spectacles comprises a base member for attachment to a support wall and comprising a rod. A gripping member is slidably mounted on the rod to retain the folded sides of a pair of spectacles against the base member against the action of spring means.

6 Claims, 5 Drawing Figures

SUPPORT DEVICE FOR DISPLAYING SPECTACLES

The present invention relates to a support device for displaying spectacles.

Various constructions of display units for spectacles are known, in which each pair of spectacles rests by its central part or bridge and by the two folded or open sides on support means.

These devices do not comprise any positive means for fixing the spectacles on the display unit and consequently they can fall easily and break. When displayed in a shop, there is a considerable danger of theft from these display units owing to the facility of removing the spectacles manually.

To remedy this drawback, the support device according to the invention comprises gripping means which ensure positive attachment of the pair of spectacles.

According to the invention, the device comprises a base fixed to a support wall, said base comprising a rod on which is slidably mounted a gripping member able to clamp the folded sides of a pair of spectacles against said base, under the action of spring means, said gripping member supporting the central part or bridge of said pair of spectacles.

Further features and advantages of the invention will be better understood on reading the ensuing description of one embodiment and with reference to the accompanying drawings in which.

Figure 1:
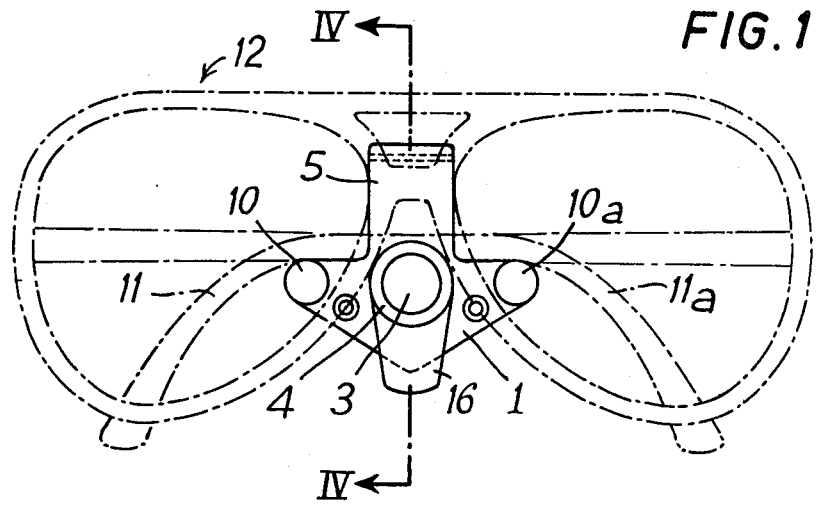
FIG. 1 is a front elevational view of a support device on which a pair of spectacles is located.
Figure 2:
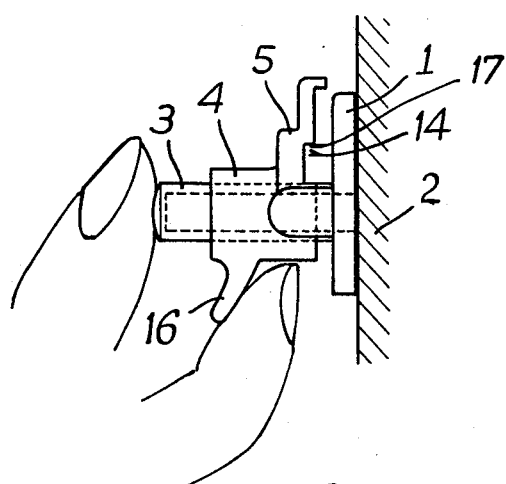
FIG. 2 is a side elevational view of the support device.
Figure 3:
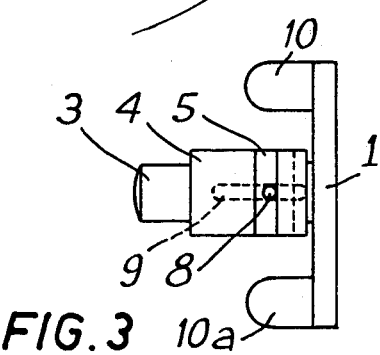
FIG. 3 is a plan view of the support device.

The embodiment of a support device for spectacles illustrated in FIGS. 1 to 4, comprises a base 1 which is fixed by any known means to a support wall 2 and which comprises a rod 3 on which is slidably mounted a sleeve 4 of a gripping member 5 co-operating with the base 1.

The rod 3 comprises a blind hole 6 in which is mounted a helical spring 7 bearing at one end against the base of the hole and at the other end against a cotter pin 8 integral with the sleeve 4 of the gripping member 5, said cotter pin being mounted to slide in two longitudinal slots 9, 9a provided in the wall of the rod 3 to ensure rectilinear guidance of the gripping member.

On either side of the rod 3, the base 1 comprises two support lugs 10, 10a on which the folded sides 11, 11a of a pair of spectacles 12 rest (FIG. 1).

Figure 4:
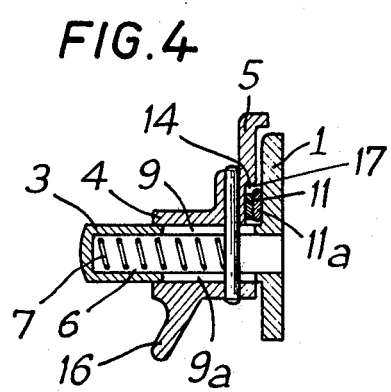
FIG. 4 is a side elevational and sectional view on line IV—IV of FIG. 1 of a support on which spectacles having metal sides of slight thickness are mounted.
Figure 5:
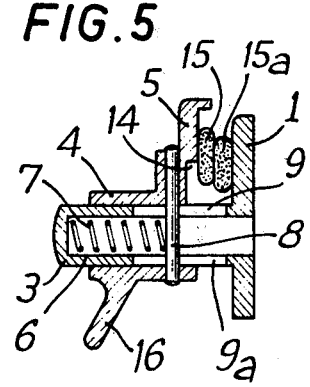
FIG. 5 is a sectional view identical to FIG. 4, but in which the spectacles have thick sides.

According to the invention, the sides 11, 11a of the pair of spectacles are clamped between the gripping member 5 and the base 1 under the action of the spring 7 (FIGS. 4 and 5).

To ensure better attachment of the sides, there is provided on the gripping member 5 adjacent the base, a housing 14 in which are engaged the sides 11, 11a of slight thickness of a pair of spectacles having a metal frame (FIG. 4). The shoulder 17 forming an abutment prevents the pair of spectacles 12 from being removed from the support device, by means of its sides, which is an anti-theft safety measure for a display unit and a safety measure when transporting a representative's display unit.

In the case of thicker sides 15, 15a (FIG. 5) the latter are clamped between the gripping member 5 and the base 1 outside said housing. The shoulder 18 forming an abutment prevents the pair of spectacles 12 from being removed from the support device, by means of its sides, which is an anti-theft safety measure for a display unit and a safety measure during transportation of a representative's display unit.

To facilitate actuation of the gripping member 5, the latter comprises a gripping finger member 16 making it possible to act manually on the gripping member in order to move the latter away from the base 1 against the action of the spring 7.

Naturally, various modifications may be applied by a man skilled in the art, to the devices or methods which have been described, solely as non-limiting examples, without diverging from the framework of the invention.

I claim:

1. A support device for displaying spectacles comprising: for attachment to a support wall, a base member, a rod forming part of the base member, a gripping member slidably mounted on the rod and able to retain the folded sides of a pair of spectacles to be displayed against said base member, spring means to urge said gripping member towards said base member to retain the spectacles thereby and two support lugs provided on the base member on either side of the rod on which the gripping member slides, which lugs support the sides of the pair of spectacles.

2. A support device according to claim 1 in which the central part or bridge of the pair of spectacles rests on the gripping member.

3. A support device according to claim 1, in which the rod is integral with the base member and defines a blind hole, and a spring bearing is placed at one end against the base of the hole and at the other end against a cotter pin integral with the gripping member, said cotter pin being mounted to slide in two guide slots provided on the rod.

4. A support device according to claim 1 in which the gripping member comprises adjacent the base member, a housing in which the sides of the pair of spectacles are engaged.

5. A support device according to claim 1 in which the gripping member comprises a gripping finger member.

6. A support device according to claim 1 in which the gripping member comprises on each housing of the gripping member, a shoulder constituting an abutment member, as a safety measure, for the side of the pair of spectacles.

* * * * *